April 11, 1961 S. LEVIN 2,979,572

APPARATUS FOR RECORDING AND REPRODUCING MAGNETIC INFORMATION

Filed July 3, 1953 2 Sheets-Sheet 1

Simon Levin
INVENTOR

April 11, 1961 S. LEVIN 2,979,572

APPARATUS FOR RECORDING AND REPRODUCING MAGNETIC INFORMATION

Filed July 3, 1953 2 Sheets-Sheet 2

Simon Levin

INVENTOR

United States Patent Office 2,979,572

Patented Apr. 11, 1961

2,979,572

APPARATUS FOR RECORDING AND REPRODUCING MAGNETIC INFORMATION

Simon Levin, 123 W. 44th St., New York 36, N.Y.

Filed July 3, 1953, Ser. No. 365,943

18 Claims. (Cl. 179—100.2)

The invention relates generally to methods of and apparatus for recording and reproducing a wide band of information in a magnetic record medium and more specifically to the recording and reproducing of extended magnetic images in permanent magnet media having such forms as tapes, sheets, cylinders, discs and the like.

The more common forms of devices for recording and reproducing magnetic signals in a magnetic record medium are based on the principle of movement of such a medium in proximity with a small gap in a toroidal ferromagnetic core operating in inductive relation with a conductive winding thereon. This gap is most often constructed as an air space but frequently is filled with a non-magnetizable material and has a response to a band of frequencies which is proportional to its length and the velocity at which it is traversed by the magnetic record medium. A device in this form is limited to sound frequencies when the magnetic record medium is moved at a low velocity, the band width capability being enlarged as the velocity is increased and the gap length decreased. To record a wide band width, as for example a group of video frequencies, an uneconomical velocity of the magnetic record medium and a gap length of impractical dimensions are required. The recording and reproducing of extended images is beyond the capabilities of such a device.

It is an object of the invention to provide methods of and apparatus for recording and reproducing magnetic signals of frequencies the equivalent of a wide band of information.

It is another object of the invention to provide methods of and apparatus for recording and reproducing magnetic signals representative of extended images.

It is another object of the invention to provide methods of and apparatus for recording and reproducing magnetic signals by means of a controllable "electronic gap."

It is a further object of the invention to provide methods of and apparatus for recording and reproducing magnetic signals by means of a series of predetermined "electronic gaps."

These and other objects of the invention will be apparent from the following description, appended claims and drawings in which:

In accordance with a broad feature of the invention, translation and control of magnetic signals are affected by alteration or regulation of the properties or characteristics of a material susceptible to magnetism. More specifically, in accordance with a broad feature of the invention, such translation and control are affected by the control of the characteristics or properties, for example, the permeability of a magnetic material so as to alter advantageously the direction of flow of magnetic flux in such a material at predetermined regions thereof.

The dregree to which a material becomes magnetized when placed in a magnetic field of given strength is called its permeability. A material characterized by a high permeability has confined within it a large portion of the magnetic flux of the field. When an air gap is made in the material, the flux spreads out or fringes at the gap and the flux density about the gap assumes a non-uniform distribution. If the air in the gap is replaced with a material of a permeability different than the material comprising the magnetic circuit, the magnetic flux will fringe into the regions about the gap in relation to the difference in permeabilities of the materials. In a like manner, if a material of given permeability is subject to a magnetic field and regions in the material have developed therein a permeability lower than other regions in the material, the magnetic flux in the material will fringe about the regions of lower permeability to to a greater extent than about those portions of the material having a higher permeability the flux being confined in the regions of lower permeability to a lesser extent than the other regions. It can readily be seen that a magnetic record medium positioned to receive the magnetic flux which fringes about the magnetic material, as set forth above, may thus store a record of signals represented by this fringing flux. Conversely, a magnetic record medium having magnetic signals recorded thereon and positioned so that the flux patterns of the recorded signals interact with the aforementioned magnetic material at the developed regions of lower permeability thereof, may thus have signals induced therein for transmission.

The word "dispersion" will be used in the specification as a general descriptive term for the changes in the properties or characteristics of the material used in accordance with the invention, such changes as are caused by relaxations, lattice defects, trapping states, dispersion of the permeability and the like or others that may be hereinafter described.

Figure 1:
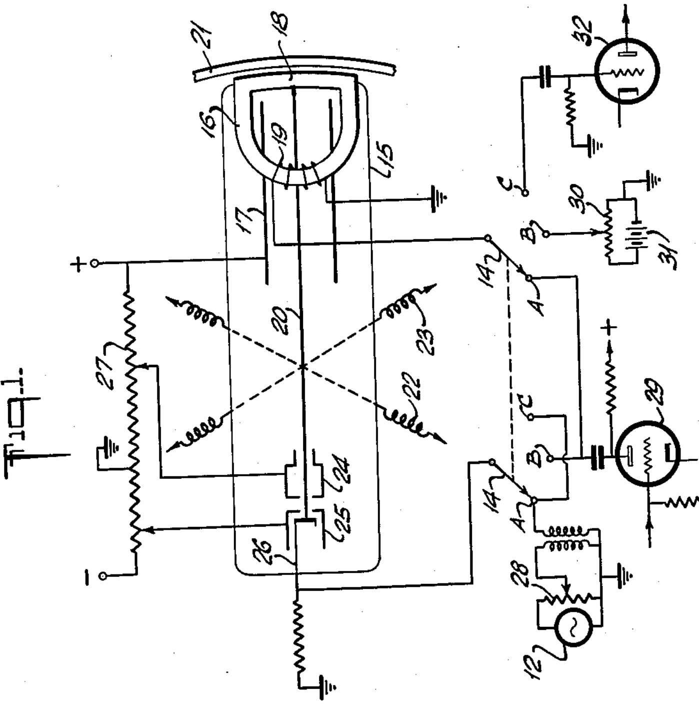
Figure 1 is a diagrammatic illustration showing the operation of an embodiment of the invention by means of a beam of electrons from a cathode ray gun.

Figure 1, by way of example, illustrates an embodiment of the invention in which reference character 15 indicates an evacuated envelope of glass or other suitable material enclosing a cathode ray gun comprising electrodes 24, 25, 26 and a tubular accelerating electrode 17. Sealed within said envelope 15 and positioned transverse to electron beam 20 is segment 18 comprising a portion of toroid 16 on which is wound the winding 19. Disposed about envelope 15 are the coils 22 and 23 for deflecting and positioning the electron beam 20 in a predetermined manner.

Switch 14, through position A, couples signal input stage 29 to winding 19 and high frequency bias supply 12 to cathode 26; through position B, signal input stage 29 is coupled to cathode 26 and direct current supply 30 and 31 is coupled to winding 19; through position C, high frequency bias supply 12 couples to cathode 26 and signal output stage 32 couples to winding 19. Cathode ray gun 24, 25, 26 and accelerating electrode 17 are energized from voltage divider 27. Positioned in close proximity to or in contact with segment 18 is magnetic record medium 21.

Figure 2:
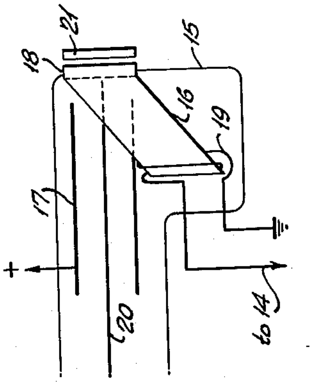
Figure 2 is a fragmentary side view of Figure 1 showing a profile of the magnetic circuit.

Figure 2 is a fragmentary side view of Figure 1 showing the construction of toroid 16 to permit access of electron beam 20 to segment 18 and the positioning of electrode 17 so as to maintain the accelerating space potential in the area of segment 18 of toroid 16 thereby, if so desired, providing control of any influence upon the beam 20 by the leakage flux as described hereinafter.

In accordance with the invention, the segment 18, representative of the area of the toroid 16 that operates in cooperation with magnetic record medium 21, is comprised of the same material of which toroid 16 is constructed or may be an insert of another magnetic material and depending on the mode of operation of the apparatus in accordance with the invention this insert may be of dimensions extending over a considerable proportion of the area of toroid 16 such as the area of segment 18 shown in Figure 1 or may have a narrow configuration, in many respects like a conventional gap.

Figure 3:
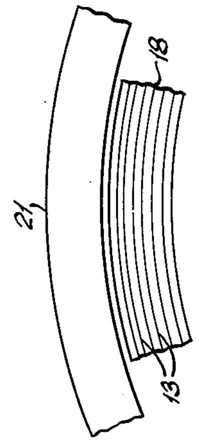
Figure 3 is a fragmentary view of a magnetic record medium positioned in relation to the magnetic circuit of Figure 1 and showing the lines of flux inside a portion of the magnetic circuit.

With switch 14 in position B, as an example of a mode of operation in accordance with the invention, a signal applied to input stage 29 and potentiometer 30 adjusted so that current flows in winding 19, lines of magnetic flux 13 are induced in segment 18 in a direction as shown in Figure 3 and electron beam 20 varies in intensity with the signal modulation from input stage 29. Potentiometrically, the depth of penetration by electron beam 20 into segment 18 may be adjusted by voltage divider 27.

Figure 4:
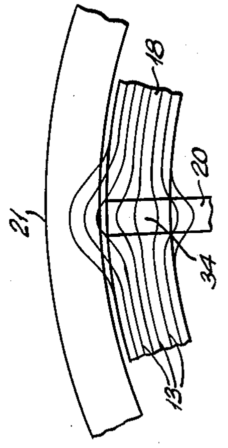
Figure 4 shows the alteration of the direction of the lines of flux shown in Figure 3 when the magnetic circuit is coupled with the electron beam.
Figure 5:
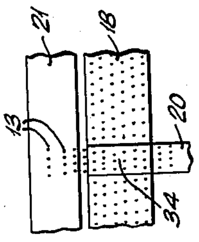
Figure 5 is a fragmentary sectional view normal to Figure 4 showing the flux displacement.
Figure 6:
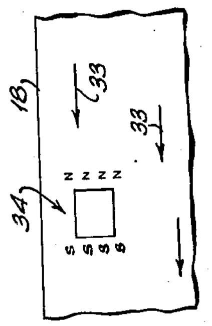
Figure 6 is a visualization of a dispersion area formed by the electron beam showing the position of the poles thus formed in relation to the flux in the magnetic circuit.

As the electrons of electron beam 20 penetrate segment 18, a dispersion region 34 is created and within this region 34 a decrease in permeability takes place causing magnetic flux 13 to fringe about the region as shown in Figure 4 thereby magnetizing magnetic record medium 21. Figure 5 shows the magnetic flux 13 fringing about dispersion region 34 and magnetizing magnetic record medium 21 in a view normal to the direction indicated in Figure 4. In Figure 6 is an imaginary view of the dispersion region 34, shown therein on the side of a fragment of segment 18 which is operated in proximity to or in contact with magnetic record medium 21. Arrows 33 indicate the direction of the magnetic flux lines. There is created on opposite sides of the dispersion region 34 a pair of poles transverse to the flux direction. These poles form, effectively, and by way of analogy, the sides of a gap and considerable magnetostatic energy may be generated between them. By dusting a fine mesh carbonyl iron powder over this region on segment 18 the fringing flux may be made visible.

The degree of dispersion of the permeability in region 34 of segment 18 varies substantially in accordance with the signal modulation impressed on electron beam 20 from input stage 29 and the flux 13 fringes in proportion to the degree of dispersion. The overall value or strength of the fringing flux that magnetizes magnetic record material 21 may be regulated by potentiometer 30.

With switch 14 in position A, as an example of another mode of operation in accordance with the invention, image signal modulation is applied to winding 19 from input stage 29 and a frequency, adjustable in intensity by potentiometer 28, is applied to cathode 26 from high frequency bias supply 12. The use of a high frequency superimposed upon electron beam 20 results in a more favorable penetration of segment 18 by electron beam 20 as will be discussed hereinafter.

Magnetic signals previously recorded on magnetic record medium 21 may be reproduced with switch 14 in position C. Winding 19 is now coupled to an output stage 32 and cathode 26 remains coupled to bias supply 12. Electron beam 20 forms the dispersion region 34 which links with flux recorded on magnetic record material 21. The flux enters the high permeability region of segment 18 by forming poles at the boundaries between the dispersion region 34 and the high permeability region, thereby inducing in winding 19 currents representative of the signals stored in magnetic record material 21.

With coils 22 and 23 coupled to a deflection supply, electron beam 20 may be deflected, for example in the form of a raster whilst magnetic record medium 21 is moved intermittently in synchronism with the raster or electron beam 20 may be deflected transversely in the form of a line whilst magnetic record material 21 moves continuously. Electron beam 20 may be utilized advantageously in accordance with the invention by being held stationary and given, for example, the shape of a slit or bar.

Segment 18 of toroid 16 comprises a substance the permeability of which may be readily changed in predetermined areas thereof. A suitable material for this purpose as an example in accordance with the invention comprises an alloy compounded from between 30 and 35 percent nickel and between 65 and 70 percent iron and in the apparatus as described, for example, in Figure 1 operated with switch 14 in position A.

An alloy of nickel and iron as described above has a low Curie point. The velocity and intensity of electron beam 20 may be adjusted from voltage divider 27 so that only those portions impinged upon by electron 20 approach or reach the Curie point thereby causing dispersion region 34. Because of the high concentration of currents which may cause saturation in this region and which enter also into the dispersion mechanism in the impinged area, the Curie point need not be reached to produce the necessary dispersion in most cases. The dissipation and diffusion of the temperature and currents in the regions outside of the impinged area is very rapid and any volume conductivity of the material has negligable effect on the permeability of the regions not impinged upon. The Curie point, for purposes of the invention, is understood to mean the temperature at which the magnetic material passes into a state which is to be regarded as non-magnetic for practical purposes. With segment 18 comprised of iron alloyed, for example, with 12% to 18% aluminum and the ground side of the winding 19 ohmically connected to the toroid 16 at a point opposite the segment 18, the differential magnetization between the area under the beam and other areas of the segment 18 may be produced, thereby causing the leakage flux. Suitable also for the purposes of the invention are alloys of iron containing nickel and molybdenum.

Another substance, for example, of which segment 18 may be constructed in accordance with the invention, is a semiconductor material that may be comprised of one or more of the ferrites which are binary oxides with the formula $MFeO_2$ or $MFe_2O_4$ where M is respectively a monovalent or bivalent metal.

Among the characteristics of such materials are a high volume resistivity decreasing with increasing frequency, a relatively high permeability and in general a polycrystalline inhomogeneous structure. Also in the behavior of such materials are the characteristics of sustaining certain losses which in the given conditions of operation of the apparatus as illustrated herein and designed for the advantageous use of these characteristics may cause a change in the permeability of the material in predetermined regions thereof.

It has been generally agreed upon by those skilled in the art that from theory confirmed by experiment the following are the more common causes of dispersion of the permeability in magnetic semiconductors and as examples in the practice of the invention, such causes may be utilized: (1) eddy currents in an inhomogeneous structure, (2) domain wall resonances, (3) dimensional resonances, (4) dispersion in the Curie temperature region, (5) electron precession resonances in crystalline magnetic anisotropy field, in granular shape anisotropy field in inhomogeneous material or precession resonances in a combination of anisotropy and ferromagnetic exchange fields.

Although the magnetic semiconductor materials exhibit a high volume resistivity and, in general, are considered to be insulators, the initial resistivity, determined by the compounding and processing of the materials as in the illustrative examples described in the above mentioned patents, may be varied in accordance with the frequency of the currents to which the particular portion of the material is subject. With switch 14, Figure 1, in position A and an image signal applied to input stage 29, a bias frequency is applied to cathode 26 from bias supply 12 through potentiometer 28. The bias frequency selected is one that will cause a decrease in resistivity in the region impinged upon by the electron beam 20, the decrease in resistivity, in general, being proportional to the increase in frequency. The conductivity increase due to the bias frequency results in a dispersion of the permeability in the impinged region which may be favorably controlled by adjustment of the bias frequency. An impinged area returns to its initial resistivity when electron beam 20 leaves the area. Carriers of charge which are created are quickly trapped in the dispersion region 34 mainly because of the inhomogeneous crystalline structure of the material and the volume conductivity, due to the space field, is negligible because of the initially high volume resistivity. The dispersion region 34 is thus confined to the immediate vicinity of electron beam 20.

Figure 7:
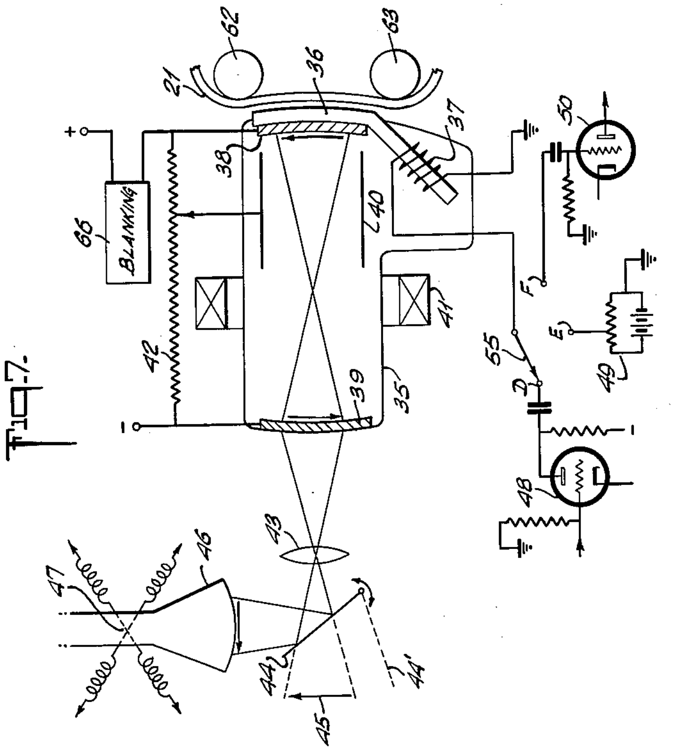
Figure 7 is a diagrammatic illustration showing the operation of an embodiment of the invention by means of focused electrons caused to be emitted by radiant energy.

In Figure 7 is shown by way of example how the invention may be applied to an arrangement sensitive to radiant energy in which reference character 35 indicates an evacuated envelope of glass or other suitable material enclosing an extended transparent cathode electrode 39 deposited in any well known manner on an end wall of envelope 35 and adapted conventionally for the emission of electrons when impinged upon by a beam of light or other radiant energy beam, a conductive tubular accelerating electrode 40 and a magnetic element 36 having wound thereon winding 37. Electrode 38, comprising for example a thin layer of aluminium, is deposited on magnetic element 36 in any well known manner and is impinged upon by the electrons emitted from cathode 39.

In accordance with the invention "radiant energy" is construed to relate to radiation not only from the visible portion of the electromagnetic spectrum but also to infrared rays, ultra violet rays, gamma rays and the like.

Figure 8:
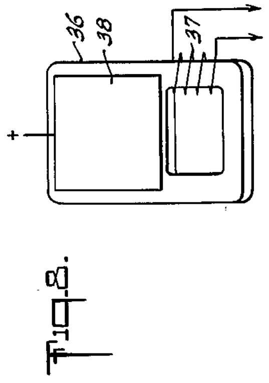
Figure 8 is a plan view of the magnetic element in the apparatus shown in Figure 7.

Figure 8 is a plan view of magnetic element 36 showing electrode 38 and energizing winding 37.

Disposed about envelope 35 is coil 41 which in combination with accelerating electrode 40 comprises an electron lens. Cathode 39, accelerating electrode 40 and electrode 38 are energized from voltage divider 42. Positioned by guides 62 and 63 in close proximity to or in contact with magnetic element 36 is magnetic record material 21. Lens 43 forms an image of the face of cathode ray tube 46 on cathode 39 through mirror 44. When mirror 44 is positioned at 44', out of the path of lens 43, objects other than the cathode ray tube 46 may be focused upon photocathode 39. Winding 37 is coupled through switch 55, in position D to an input stage 48; through position E to an adjustable direct current supply 49 and through position F to an output stage 50. Blanking circuit 66 permits the energizing supply to voltage divider 42 to be controlled in a predetermined manner.

With switch 55 in position E, for example, direct current supply 49 is adjusted so that winding 37 induces magnetic flux in magnetic element 36. Magnetic element 36 in construction is substantially a toroid and the magnetic flux induced in the segment under electrode 38 has a direction in a like manner as the magnetic flux 13 in segment 18 of Figure 3. In a like manner as segment 18 of toroid 16 in Figure 1, the area of magnetic element 36 under electrode 38 may be an insert of another magnetic material. With mirror 44 in position 44', lens 43 may be focused on any object thus forming an extended image on cathode 39. Electron lens 41 and 40 focus an extended image of the object on electrode 38 by means of the electrons emitted from cathode 39. The emitted electrons penetrate electrode 38 and bombard magnetic element 36 in proportion to the density of the emitted electrons comprising the extended image, the depth of penetration being controllable from voltage divider 42. A series of dispersion areas are created in a like manner as area 34 in Figures 4, 5 and 6 and fringing magnetic flux is impressed in magnetic record medium 21. Magnetic material 36 is comprised, substantially, of the same material as segment 18 in Figure 1 and the dispersion mechanisms described therein apply to the embodiment of the invention as shown in Figure 7.

Because of the extended nature of the images projected on electrode 38, magnetic record material 21 may be moved intermittently in any well known manner such as in movie cameras, the transport mechanism being synchronized with blanking circuit 66 so that power to the electron lens is cut off during the period of motion and restored when the motion ceases. In a like manner, with mirror 44 in a position as indicated in Figure 7, magnetic recordings may be made of television pictures from the face of cathode ray tube 46, the blanking circuit 66 adapted for being synchronized by the line and frame pulses of the pictures. Images stored as magnetic signals may be reproduced from magnetic record material 21 by either moving it intermittently or continuously. When moving intermittently, deflection coils 47 are impressed with a conventional horizontal and vertical sweep to form a fixed intensity raster on cathode ray tube 46 and blanking circuit 66 is synchronized with the raster blanking. The emitted electrons from cathode 39 scan electrode 38 forming thereby a consecutive series of dispersions in magnetic material 36 as described heretofor. Thus with switch 55 in position F, the image signals induced in winding 37 are coupled to output stage 50. By coupling output stage 50 to the video amplifier of, for example, a television receiver which has its deflection circuits synchronized with deflection coils 47, the signals recorded in magnetic record material 21 may be reproduced. Utilizing only one set of the deflection coils 47 and scanning with a single transverse line, magnetic record material 21 may be moved continuously.

The scanning mechanism as described for reproducing the magnetic signals may be utilized for recording by impressing image signals on input stage 48 with switch 55 in position D giving an alternate mode of recording in accordance with the invention.

Figure 9:
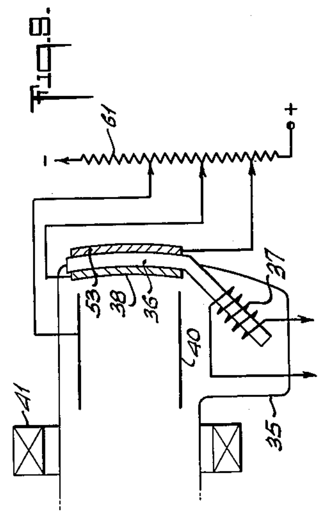
Figure 9 is a fragmentary view of Figure 7 showing an alternate electrode arrangement on the magnetic element in the apparatus shown in Figure 7.

Figure 9 is a fragmentary view of Figure 7 showing an additional electrode 53 on the side of magnetic element 36 opposite electrode 38 and which is comprised, for example, of a material such as chromium. Electrode 53 and electrode 38 are energized from voltage divider 61. By adjusting the potential difference between electrode 38 and electrode 53, substantial control may be had, as for example over the contrast and definition of the dispersion areas.

Figure 10:
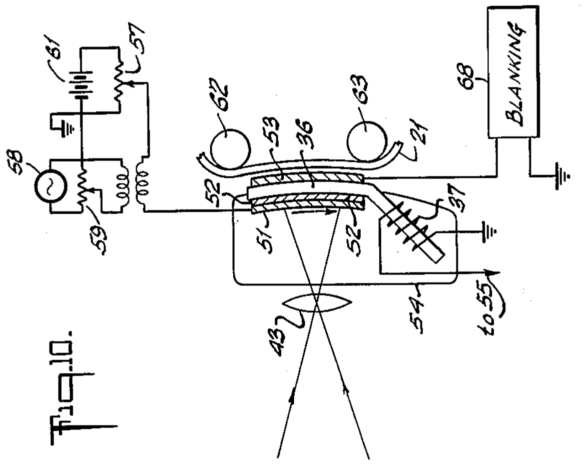
Figure 10 shows, schematically, an embodiment of the invention operated directly with radiant energy.

In Figure 10 is shown, by way of example, how the invention may be applied to an arrangement sensitive to radiant energy without utilizing the emissive cathode 39 and electron lens 41 and 40, in which reference character 54 indicates an envelope of glass or other suitable material, preferably although not necessarily evacuated, enclosing magnetic element 36 having wound thereon the winding 37. As described in Figure 9, magnetic element 36 has in contact thereon the electrode 53. In place of electrode 38, as shown in Figure 9, there is deposited in any well known manner a photoconductive layer 52, as for example red amorphous selenium, which is an insulator when not subject to radiant energy forming substantially a barrier layer. Applied to photoconductive layer 52 is a conventional transparent conductive electrode 51. Electrode 53 is connected through a blanking circuit 68 to ground potential. Transparent electrode 51 is connected in series with a direct current supply 61 controlled by potentiometer 51 and an alternating current bias supply 58 controlled by potentiometer 59, both supplies being returned to ground. Winding 37 may be connected to a switch 55 as shown in Figure 7 and may utilize input stage 48, direct current supply 49 and output stage 50 in substantially the same manner as described for the apparatus in Figure 7. Lens 43 may be utilized to project images on transparent electrode 51 from object 45 and cathode ray tube 46 in a like manner as described in Figure 7. Magnetic record material 21 is guided and transported by a similar mechanism as that described for the apparatus in Figure 7.

In operation, and with switch 55 in position E, direct current supply 49 induces magnetic flux in magnetic element 36 by means of winding 37. Adjusting potentiometer 59 to zero to cut off alternating current bias supply 58, a potential difference is produced between transparent electrode 51 an electrode 53 by direct current supply 61 through potentiometer 57. Lens 43, as described in Figure 7, focuses an image of the face of cathode ray tube 46 or of an object 45 through transparent electrode 51 on to photoconductive layer 52 which becomes conductive in proportion to the intensity of the illumination directed thereon.

Magnetic element 36, although having a high volume resistivity is initially conductive to a certain extent as has been described in the foregoing and by virtue of the inhomogeneous structure and resistivity, conduction is generally limited to those areas where conduction is excited. Diffusion of carriers of charge is controlled by the areas of photoconductive electrode 52 impinged upon by the rays of radiant energy from lens 43. A dispersion of the permeability in magnetic element 36 takes place in proportion to the currents flowing and the magnetic flux in magnetic element 36 fringes about the dispersion areas thereby storing a record in magnetic record material 21. The dispersion sensitivity of the permeability and the resistivity of magnetic element 36 may be controlled by applying a high frequency bias to magnetic element 36 by means of alternating supply 58. With increasing frequency the resistivity decreases and the dispersion increases as has been described in the foregoing example in Figure 1. By adjusting potentiometer 57 to zero, alternating currents alone may be applied to electrode 53 and transparent electrode 51. In lieu of electrode 53, a magnetic record material 21 in the form of a steel tape, as an example, grounded through blanking circuit 68, may be utilized in accordance with the invention.

With switch 55 in position F, signals recorded on magnetic record material 21 may be reproduced and with switch 55 in position D, an alternate mode of recording is available. Reference may be had to Figure 7 and the description thereof for details of these example modes of operation.

Magnetic element 36 may be constructed of a semiconductor which is comprised of a ferrite wherein the binary oxides of iron are combined with the rare earth elements as for example with gadolinium. The device as illustrated in Figure 10 when constructed with magnetic element 36 having included therein gadolinium, may record the images of objects illuminated by neutrons. Photoconductive layer 52 and lens 43 may be eliminated, the neutrons impinging on magnetic element 36. In substances containing gadolinium, a large number of carriers of charge are liberated per incoming neutron and by a similar mechanism as described in the foregoing examples in accordance with the invention, dispersion areas are created and the fringing flux stores in the magnetic record material 21 a record of the neutron radiation.

The semiconductor materials utilized in the various examples in accordance with the invention and described herein may have Curie temperatures at predetermined points. As described in Figure 1 and in the same manner in which segment 18 is operated when comprised of the alloy of nickel and iron described therein, magnetic element 36 may also be utilized, as an example, for the purposes of the invention.

It is to be understood that the specific embodiments of the invention shown and described herein are but illustrative and that various modifications may be made therein without departing from the scope and spirit of the invention.

What is claimed is:

1. An apparatus for recording and reproducing magnetic signals which comprises a magnetically susceptible medium, means for producing a change in the magnetic state of predetermined regions of said magnetically susceptible medium, means for subjecting a recording medium to said predetermined regions, means for subjecting said magnetically susceptible medium to signals whereby magnetism escaping at said predetermined regions is impressed in said recording medium during a recording operation and means for deriving signals during a reproducing operation from the magnetism induced in said magnetically susceptible medium by signals in said recording medium.

2. An apparatus for recording and reproducing magnetic signals as claimed in claim 1 wherein said means for producing said change in the magnetic state of said predetermined regions comprises electron discharge means.

3. An apparatus for recording and reproducing magnetic signals as claimed in claim 1 wherein said means for producing said change in the magnetic state of said predetermined regions comprises radiant energy means.

4. An apparatus for recording and reproducing magnetic signals which comprises a magnetically susceptible material body, means for producing a change in the permeability of predetermined regions of said body, means for subjecting a recording medium to said predetermined regions, means for subjecting said body to signals whereby magnetism escaping at said predetermined regions is impressed in said recording medium during a recording operation and means for deriving signals from said body during a reproducing operation from the magnetism applied to said predetermined regions by signals from said recording medium.

5. An apparatus for recording and reproducing magnetic signals as claimed in claim 4 wherein means are included for operating said magnetically susceptible material body in the Curie region thereof.

6. An apparatus for recording and reproducing magnetic signals which comprises a magnetically susceptible material body serving as a recording and pick-up element, means for producing a beam of electrons, means to couple said beam with said body whereby a change is produced in the magnetic properties of the regions of said body impinged upon by said beam, means for subjecting a recording medium to said regions, means to subject said body to signals whereby magnetism escaping at said regions is impressed in said recording medium during a recording operation and means for deriving signals during a reproducing operation from the magnetism induced in said body by signals from said recording medium.

7. An apparatus for recording and reproducing magnetic signals as claimed in claim 6 wherein said means for producing said beam of electrons is in the form of a cathode ray gun, means are provided for deflecting said beam and means are provided for controlling said beam in the proximity of said body.

8. An apparatus for recording and reproducing magnetic signals as claimed in claim 6 wherein said body is comprised of a semiconductor material, means are provided to apply bias signals to said body in addition to signals in accordance with the intelligence to be stored in said recording medium and means for controlling the degree of imprimgement of said body by said beam.

9. An apparatus for recording and reproducing magnetic signals which comprises a magnetic material body serving as a recording and pick-up device, means for producing a beam of electrons, means to couple said beam with said body whereby a change is produced in the magnetic state of the regions of said body impinged upon by said beam, means for subjecting a recording medium to said regions, said recording medium being of the type displaceable with respect to said body, means for energizing said body, means for modulating said beam with intelligence to be recorded whereby magnetism escaping at said regions is impressed in said recording medium during a recording operation and means for deriving signals from the magnetism applied to said body by signals from said recording medium.

10. An apparatus for recording and reproducing magnetic signals which comprises a magnetically susceptible material body serving as a recording and pick-up element, cathode means adapted for the emission of electrons when impinged upon by rays of radiant energy, means for coupling said emission of electrons with said body whereby a change is produced in the magnetic state of the regions of said body impinged upon by said emission of electrons, means for controlling the degree of impingement of said body by said emission of electrons, means for subjecting a recording medium to said regions, means to subject said body to signals whereby magnetism escaping at said regions is impressed in said recording medium during a recording operation and means for deriving signals during a reproducing operation from the magnetism applied to said body at said regions impinged upon by said emission of electrons.

11. An apparatus for recording magnetic signals which comprises a magnetically susceptible material body, cathode means adapted for the emission of electrons when impinged upon by rays of radiant energy, means for focusing and directing said emission of electrons from said cathode means to said body whereby a change is produced in the magnetic properties of the regions of said body impinged upon by said emission of electrons, means for forming and directing said rays of radiant energy, means for subjecting a recording medium to said regions, means for energizing said body whereby magnetism escaping at said regions is impressed in said recording medium, said escaping magnetism thereby being representative of the intelligence contained in said rays of radiant energy.

12. An apparatus for reproducing magnetic signals which comprises a magnetically susceptible material body, electron beam producing means comprising a cathode adapted for the emission of electrons when impinged upon by rays of radiant energy, means for focusing and directing said electron beam from said cathode means to said body whereby a change is produced in the magnetic properties of the regions of said body impinged upon by said electron beam, means for subjecting a recording medium to said regions, means for forming and directing said rays of radiant energy, means for scanning said cathode with said rays of radiant energy, means to synchronize said means for scanning said cathode with means for transporting said recording medium with respect to said regions and means for deriving signals from the magnetism applied to said body by the signals previously impressed in said recording medium, said change in magnetic properties of said regions comprising the means of entry into said body of said magnetic record signals.

13. An apparatus for recording and reproducing magnetic signals which comprises a photomagnetic body serving as a recording and pick-up device, means for energizing said body with intelligence to be recorded, means for applying a recording medium to predetermined areas of said body, means for subjecting rays of radiant energy to said predetermined regions whereby a change is produced in the magnetic state of said predetermined regions, said change in magnetic state causing the magnetism in said body to escape at said predetermined regions, and means co-operative with said body for conveying to a utilization means the signals derived from the magnetism induced in said body by signals previously recorded in said recording medium, said change in magnetic state of said predetermined areas comprising the means for the entry into said body of said signals from said recording medium.

14. An apparatus for recording and reproducing magnetic signals which comprises a magnetic semiconductor material body serving as a recording and pick-up device, photoconductive means co-operative with said body, means for forming and directing rays of radiant energy to said photoconductive means whereby a change in magnetic properties is caused in the areas of said body adjacent to said areas of said photoconductive means impinged upon by said rays of radiant energy, means for subjecting a recording medium to said areas of said body, means for controlling carriers of charge between said photoconductive means and said body, means for energizing said body whereby magnetism in said areas of said body is impressed in said recording medium during a recording operation and means for conveying to a utilization circuit the currents produced by the magnetism induced in said body by the signals from said recording medium.

15. An apparatus for recording magnetic information which comprises a magnetically susceptible material body, means for producing a beam of electrons, means for causing said beam to impinge on successive regions of said body whereby a change is produced in the magnetic state of said impinged regions, means for energizing said body whereby said change in state produces a difference in magnetization between said reigons impinged upon by said beam and other regions of said body; and means cooperative with said body for indicating the magnetic condition of said impinged regions.

16. An apparatus for recording and reproducing magnetic information which comprises a magnetically susceptible material body, means for producing a beam of electrons, means for causing said beam to impinge on successive regions of said body whereby a change is produced in the magnetic state of said impinged regions, means for energizing said body whereby said change in state produces a difference in magnetization between said regions impinged upon by said beam and other regions of said body, said body adapted to cause said impinged regions to assume substantially their prior magnetic state when said beam ceases to impinge said regions, means for subjecting a recording medium to said impinged regions, means for subjecting said body to signals whereby a magnetic representation of said signals is impressed in said record medium during a recording operation; and means for deriving signals during a reproducing operation from the magnetism applied to said body by signals previously impressed in said recording medium.

17. An apparatus for recording and reproducing magnetic signals which comprises a ferromagnetic metallic alloy body, means for producing a change in the magnetic state of predetermined regions of said body, said change in state producing a difference in magnetization between said predetermined regions and other regions of said body, means for subjecting a recording medium to said predetermined regions, means for energizing said body whereby magnetism fringing at said predetermined regions is applied to said recording medium during a recording operation; and means for deriving signals during a reproducing operation from the magnetism applied to said body by signals previously impressed in said recording medium.

18. An apparatus for recording and reproducing magnetic signals which comprises a semiconductor material comprised of a ferrite with the formula $MFeO_2$ or $MFe_2O_4$ where M is respectively a monovalent or a bivalent metal, means for producing a change in the magnetic state of predetermined regions of said semiconductor material, said change in magnetic state producing a difference in magnetization between said predetermined regions and other regions of said semiconductor material, means for subjecting a recording medium to said predetermined regions, means for energizing said semiconductor material whereby magnetism fringing at said predetermined regions is impressed in said recording medium during a recording operation; and means for deriving signals during a reproducing operation from the magnetism applied to said semiconductor material by signals in said recording medium.

References Cited in the file of this patent

UNITED STATES PATENTS

| | | |
|---|---|---|
| 2,200,741 | Gray | May 14, 1940 |
| 2,213,246 | Heller | Sept. 3, 1940 |
| 2,273,793 | Ekstrand | Feb. 17, 1942 |
| 2,720,558 | Skellett | Oct. 11, 1955 |
| 2,725,430 | Gratian et al. | Nov. 29, 1955 |